US012661695B2

(12) United States Patent
Tan et al.

(10) Patent No.: US 12,661,695 B2
(45) Date of Patent: Jun. 23, 2026

(54) PARTICLE REMOVAL SYSTEM AND METHOD FOR CONTROLLING PARTICLE REMOVAL SYSTEM

(71) Applicants: KAWASAKI JUKOGYO KABUSHIKI KAISHA, Kobe (JP); Kawasaki Robotics (USA), INC., Wixom, MI (US)

(72) Inventors: Haruhiko Tan, Kobe (JP); Ryan Le, Sacrament, CA (US); Theodore Philliber, San Jose, CA (US); Simon Jeyapalan, Newark, CA (US); Nobuyasu Shimomura, San Jose, CA (US); Avish Ashok Bharwani, Santa Clara, CA (US)

(73) Assignees: KAWASAKI JUKOBYO KABUSHIKI KAISHA, Kobe (JP); KAWASAKI ROBOTICS (USA), INC., Wixom, MI (US)

( * ) Notice: Subject to any disclaimer, the term of this patent is extended or adjusted under 35 U.S.C. 154(b) by 125 days.

(21) Appl. No.: 18/396,052

(22) Filed: Dec. 26, 2023

(65) Prior Publication Data

US 2025/0205757 A1     Jun. 26, 2025

(51) Int. Cl.
| | |
|---|---|
| *B08B 6/00* | (2006.01) |
| *B08B 1/14* | (2024.01) |
| *B08B 1/50* | (2024.01) |
| *B25J 15/00* | (2006.01) |

(52) U.S. Cl.
CPC .................. *B08B 6/00* (2013.01); *B08B 1/14* (2024.01); *B08B 1/50* (2024.01); *B25J 15/0019* (2013.01)

(58) Field of Classification Search
CPC ........... H01L 21/67011; H01L 21/6836; H01L 21/687; B08B 6/00; B08B 7/0028
See application file for complete search history.

(56) References Cited

U.S. PATENT DOCUMENTS

| | | | |
|---|---|---|---|
| 9,093,481 B2 * | 7/2015 | Levinson | .......... H01L 21/67011 |
| 2004/0079385 A1 | 4/2004 | Frisa et al. | |
| 2021/0402445 A1 | 12/2021 | Smith | |
| 2023/0236583 A1 | 7/2023 | Zhang et al. | |
| 2023/0245871 A1 | 8/2023 | Nagaike et al. | |

FOREIGN PATENT DOCUMENTS

| | | | | |
|---|---|---|---|---|
| JP | H07142440 A | * | 6/1995 | |
| JP | H11-224895 A | | 8/1999 | |
| JP | 2016-039250 A | | 3/2016 | |
| JP | 2023-111721 A | | 8/2023 | |
| KR | 20100049295 A | * | 5/2010 | ....... H01L 21/68707 |

\* cited by examiner

*Primary Examiner* — Shay Karls
(74) *Attorney, Agent, or Firm* — METROLEX IP LAW GROUP, PLLC; Robert L. Scott, Esq.

(57) ABSTRACT

A particle removal system according to this disclosure includes a particle absorption tool configured to absorb particles, and a robot. The robot is configured to perform absorption operation that includes at least one of moving the particle absorption tool and pressing the particle absorption tool down in the target area in a target area for absorption of particles during the absorption of particles.

12 Claims, 9 Drawing Sheets

500

PARTICLE REMOVAL SYSTEM — 100

ALIGNER — 140

ROBOT — 150
151
HAND
152
ROBOT ARM
152a
DRIVER

PARTICLE ABSORPTION TOOL — 10

CHARGER — 20
VOLTAGE APPLIER — 21

CONTAINER — 30

CONTROLLER — 160
MAIN CONTROLLER — 161
SERVO CONTROLLER — 162
DRIVE CIRCUIT — 163
STORAGE — 164

DETECTOR — 50
CHARGE-AMOUNT DETECTOR — 51
IMAGE CAPTURER — 52

CLEANER — 60

IV                10                IV

PARTICLE REMOVAL SYSTEM AND METHOD FOR CONTROLLING PARTICLE REMOVAL SYSTEM

BACKGROUND OF THE INVENTION

Field of the Invention

The present disclosure relates to a particle removal system and a method for controlling a particle removal system.

Description of the Background Art

Tools for absorbing particles such as dust in semiconductor production apparatuses are known in the art. Japanese Patent Laid-Open Publication No. JP H11-224895 discloses a disk-shaped particle-removing tool configured to be electrostatically charged. In Japanese Patent Laid-Open Publication No. JP H11-224895, the disk-shaped particle-removing tool is held by a hand of a robot arm placed in a substrate conveyor similar to wafers. When the particle-removing tool comes in contact with the hand, and particles that cling to the hand are absorbed to the particle-removing tool brought in a charged state. As a result, the particles clinging to the hand can be removed from the hand.

Here, as disclosed in Japanese Patent Laid-Open Publication No. JP H11-224895, in a case in which particles are removed by using the particle-removing tool for absorbing particles, the particle-removing tool is not held only by the hand for holding the wafer but also conveyed to a receiving part on which the wafer is placed in the semiconductor production apparatus to remove particles in some cases. In such a case, it is desired to efficiently absorb particles in a target area for absorption of particles such as the receiving part.

SUMMARY OF THE INVENTION

The disclosure invention is intended to solve the above problem, and one object of the present disclosure is to provide a particle removal system and a method for controlling a particle removal system capable of efficiently absorbing particles in a target area for absorption of particles.

A particle removal system according to a first aspect of the present disclosure includes a particle absorption tool configured to absorb particles; a robot configured to perform absorption operation that includes at least one of moving the particle absorption tool and pressing the particle absorption tool in a target area for absorption of particles during the absorption of particles.

As discussed above, the particle removal system according to the first aspect of the present disclosure includes the robot configured to perform absorption operation that includes at least one of moving the particle absorption tool and pressing the particle absorption tool in the target area for absorption of particles during the absorption of particles.

Accordingly, because absorption operation that includes at least one of moving the particle absorption tool and pressing the particle absorption tool is performed during the absorption of particles, it possible to more efficiently absorb particles as compared with a case in which the particle absorption tool is merely conveyed to and placed in the target area. Consequently, it is possible to efficiently absorb particles in the target area for absorption of particles.

A method for controlling a particle removal system according to a second aspect of the present disclosure includes holding a particle absorption tool configured to absorb particles by using a robot; and performing absorption operation that includes at least one of moving the particle absorption tool and pressing the particle absorption tool in a target area for absorption of particles during the absorption of particles by using the robot.

As discussed above, the method for controlling a particle removal system according to a second aspect of the present disclosure includes performing absorption operation that includes at least one of moving the particle absorption tool and pressing the particle absorption tool in a target area for absorption of particles during the absorption of particles by using the robot. Accordingly, because absorption operation that includes at least one of moving the particle absorption tool and pressing the particle absorption tool is performed during the absorption of particles, it possible to more efficiently absorb particles as compared with a case in which the particle absorption tool is merely conveyed to and placed in the target area. Consequently, it is possible to provide a method for controlling a particle removal system capable of efficiently absorbing particles in the target area for absorption of particles.

According to a particle removal system and a method for controlling a particle removal system of the present disclosure, it is possible to efficiently absorb particles in the target area for absorption of particles.

DESCRIPTION OF THE PREFERRED EMBODIMENT

First Embodiment

The following description will describe a first embodiment embodying the present disclosure with reference to the drawings.

The following description describes a particle removal system 100 according to a first embodiment with reference to FIGS. 1 to 12. In this specification, the upward/downward direction is defined as a Z direction. An upper side is defined a Z1 side, and a lower side is defined as a Z2 side. A direction orthogonal to the Z direction is defined as an X direction. One side in the X direction is defined as an X1 side, and another side is defined as an X2 side. A direction orthogonal to the Z direction and the X direction is defined as a Y direction. One side in the Y direction is defined as an Y1 side, and another side is defined as an Y2 side.
(Semiconductor Production Apparatus)

Figure 1:
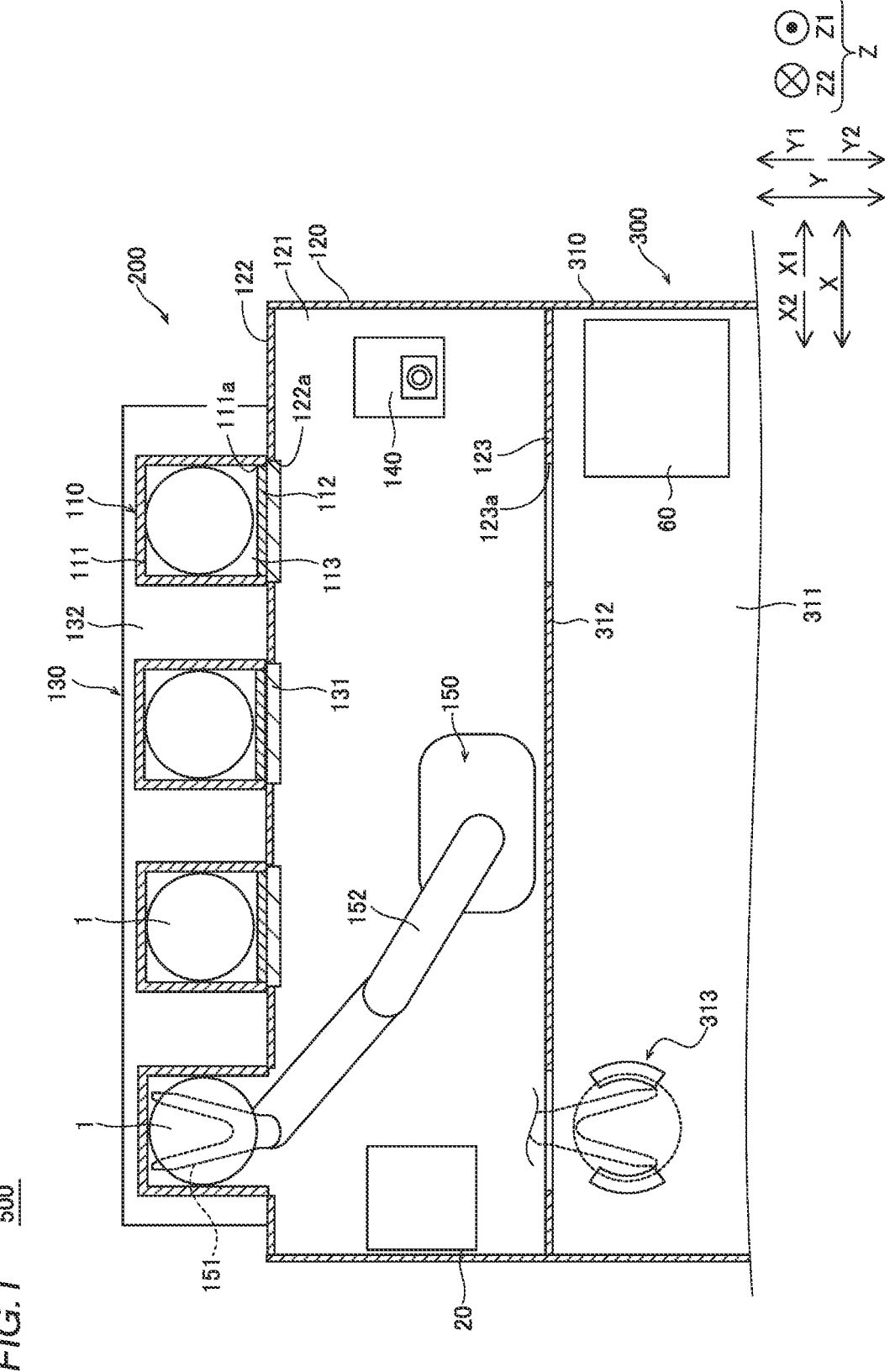
FIG. 1 is a view showing a semiconductor production apparatus according to a first embodiment.

The following description describes a semiconductor production apparatus 500. As shown in FIG. 1, the semiconductor production apparatus 500 is an apparatus for processing substrates 1 formed of a semiconductor such as wafers. The semiconductor production apparatus 500 includes a substrate conveyor 200 and a substrate processor 300. The semiconductor production apparatus 500 is placed a clean room, for example.
(Substrate Conveyor)

The following description describes the substrate conveyor 200. For example, the substrate conveyor 200 is an EFEM (Equipment Front End Module). The substrate conveyor 200 includes FOUPs 110, a housing 120, an FOUP opener 130, an aligner 140, a robot 150, and a controller 160 shown in FIG. 2.
(FOUP)

Each FOUP 110 contains a plurality of substrates 1 before and after processing. An interior of the FOUP 110 is maintained clean similar to the clean room. The FOUP 110 includes a housing 111 and an opening/closing part 112. The housing 111 has a box shape, and includes an opening 111*a* opened toward an interior of the substrate conveyor 200. The opening/closing part 112 configured to cover the opening 111*a* of the housing 111. The number of FOUPs 110 is four, for example.
(Housing)

The housing 120 has interior space 121. The interior space 121 is filled with a highly clean atmospheric gas. A robot 150 is placed in the interior space 121 of the housing 120. The housing 120 has a rectangular shape, for example. The housing 120 includes a wall 122 on the Y1 side having an opening 122*a* through which interior space of the housing is connected to the interior space 113 of the FOUP 110. Each substrate 1 can be moved between the FOUP 110 and the substrate conveyor 200 through the opening 122*a*. The housing 120 includes a wall 123 on the Y2 side having an opening 123*a* through which interior space of the housing is connected to interior space 311 of the substrate processor 300. Each substrate 1 can be moved between the substrate processor 300 and the substrate conveyor 200 through the opening 123*a*.

The following description describes the FOUP opener 130. The FOUP opener 130 is placed on the Y1 side of the substrate conveyor 200. The FOUP opener 130 includes opening/closing parts 131 and an FOUP support 132. Each opening/closing part 131 is arranged on the opening 122*a* of the wall 122 on the Y1 side of the housing 120. An opening mechanism configured to operate opening/closing part 131 and the opening/closing part 112 opens the opening/closing part 131 of the FOUP opener 130 and the opening/closing part 112 of the FOUP 110 so that the interior space 113 of the FOUP 110 is connected to the interior space 121 of the housing 120.

The following description describes the aligner 140. The aligner 140 is configured to receive the substrate 1 on the aligner. The aligner 140 adjusts a position of the substrate 1. The aligner 140 executes at least one of rotating the substrate 1 to align the substrate 1 so as to agree a notch or an orientation flat formed in the substrate 1 with a predetermined orientation, and detecting an edge of the substrate 1 and eccentricity of the substrate 1 while rotating the substrate 1. The aligner 140 is placed in the interior space 121 of the housing 120 of the substrate conveyor 200.

The following description describes the robot 150. The robot 150 is placed in the interior space 121 of the housing 120 of the substrate conveyor 200. The robot 150 is a horizontal multi-joint robot, for example. The robot 150 includes a hand 151 and a robot arm 152. The hand 151 is configured to hold the substrate 1. For example, the hand 151 has a Y shape forming a bifurcated distal end. The hand 151 is arranged on a distal end of the robot arm 152. The robot arm 152 includes a plurality of links.

Figures 2, 3:
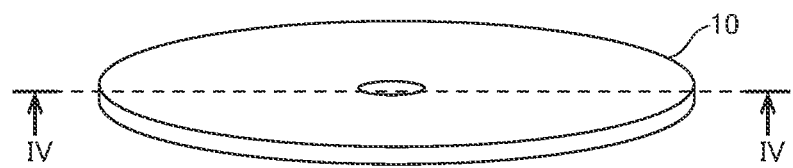
FIG. 2 is a block diagram showing a particle removal system according to the first embodiment.
FIG. 3 is a view showing a particle absorption tool according to the first embodiment.

The following description describes a configuration of the controller 160. The controller 160 is a robot controller. As shown in FIG. 2, the controller 160 includes a main controller 161, a servo controller 162, drive circuits 163, and a storage 164. The main controller 161 and the servo controller 162, for example, include a CPU (Central Processing Unit). The main controller 161 controls drivers 152*a* of the robot arm 152. The servo controller 162 controls electric power supplied to the drivers 152*a* of the robot arm 152 based on commands from the main controller 161. The drive circuits 163 supply driving power to the drivers 152*a* of the robot arm 152. Specifically, the robot arm 152 includes two or more drivers 152*a*, and each of the drive circuits 163 is provided for corresponding one of the drivers 152*a* of the robot arm 152. Alternatively, one common drive circuit 163 can be provided for the drivers 152*a*. Each driver 152*a* includes a servo motor, an encoder and a reduction gear. The storage 164 stores programs to be executed by the controller 160.
(Substrate Processor)

The following description describes the substrate processor 300. As shown in FIG. 1, the substrate processor 300 configured to apply processing to the substrate 1. For example, the substrate processor 300 can apply the processes such as thermal process, impurity introduction process, thin-film formation process, lithography process, cleaning process, and planarization process to the substrate 1. The substrate processor 300 is arranged adjacent to the substrate conveyor 200. The substrate processor 300 includes a housing 310 with interior space 311. A wall 312 on the Y1 side of the housing 310 of the substrate processor 300 is the same as the wall 123 on the Y2 side of the housing 120 of the substrate conveyor 200. A substrate receiving part 313 on which the substrate 1 is placed is arranged in the interior space 311 of the substrate processor 300.
(Particle Removal System)

The particle removal system 100 is a system for removing particles in semiconductor production apparatus 500. As shown in FIG. 2, the particle removal system 100 includes the aligner 140, the robot 150, the particle absorption tool 10, a charger 20, a container 30, a detector 50, a cleaner 60, and the controller 160.

(Particle Absorption Tool)

The following description describes the particle absorption tool 10. The particle absorption tool 10 can be held on the hand 151. Also, the particle absorption tool 10 is configured to be electrostatically charged so as to build up a static electric charge for absorbing particles. Also, as shown in FIG. 3, the particle absorption tool 10 has, for example, a disk shape, and has the same diameter as the substrate 1. In other words, the particle absorption tool 10 has a disk shape similar to the substrate 1. In the first embodiment, the hand 151 of the robot 150 is configured to hold the substrate 1 and the particle absorption tool 10 in the substrate conveyor 200. The hand 151 is an active type substrate holding hand configured to securely hold the substrate 1 and the particle absorption tool 10 by using an edge grip configured to pinch and hold a periphery of the substrate 1 or the particle absorption tool 10.

Figure 4:
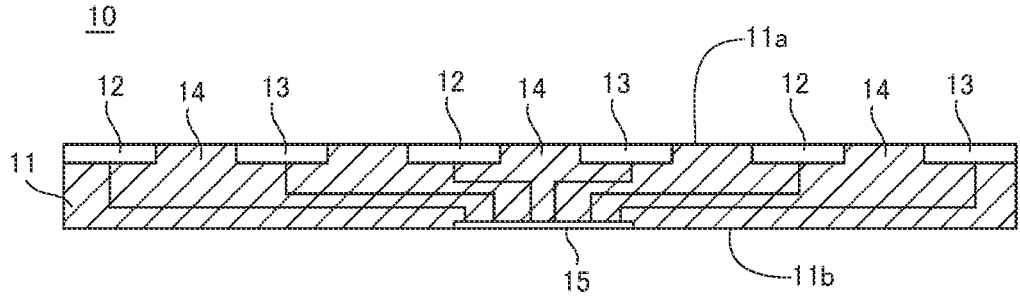
FIG. 4 is a cross-sectional view of the particle absorption tool taken along a line IV-IV in FIG. 3.

As shown in FIG. 4, the particle absorption tool 10 includes a semiconductor substrate 11, and anodes 12, cathodes 13, bias electrodes 14, and an interface 15, for example. The anodes 12 and the cathodes 13 are formed by impurity introduction. The anodes 12, the bias electrodes 14, and the cathodes 13 are arranged in this order on one surface 11a as a main surface of the semiconductor substrate 11. The interface 15 is arranged on another surface 11b opposite to the main surface of the semiconductor substrate 11. The interface 15 is connected to the anodes 12 and the cathodes 13. A voltage is applied to the interface 15 from the charger 20 shown in FIG. 1. Accordingly, the voltage is applied to the anodes 12 and the cathodes 13 so that the one surface 11a of the semiconductor substrate 11 is charged.

(Charger)

The following description describes the charger 20. The charger 20 is a device configured to electrostatically charge the particle absorption tool 10 so as to build up the static electric charge. As shown in FIG. 2, the charger 20 includes a voltage applier 21.

Figure 5:
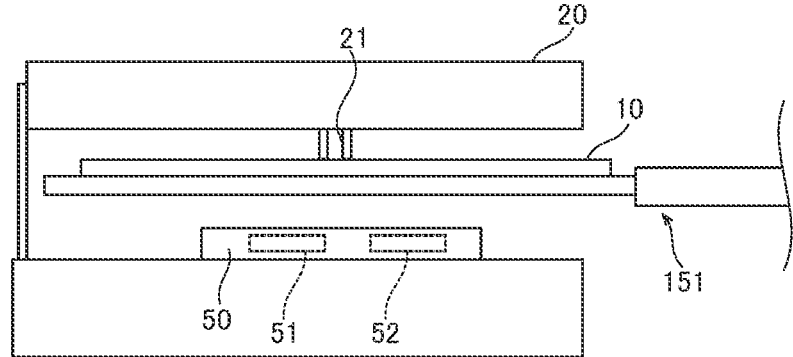
FIG. 5 is a view showing a charger according to the first embodiment.

As shown in FIG. 5, the voltage applier 21 is configured to contact the interface 15 of the particle absorption tool 10 and to apply a voltage to the particle absorption tool 10. For example, the voltage applier 21 contains a plurality of probes. When the plurality of probes of the voltage applier 21 come into contact with the interface 15 of the particle absorption tool 10, the voltage can be applied to the anodes 12 and the cathodes 13. For example, as shown in FIG. 1, the charger 20 is placed in the interior space 121 of the housing 120 of the substrate conveyor 200. The charger 20 is configured to bring the probes of the voltage applier 21 to the interface 15 of the particle absorption tool 10 being held by the hand 151 of the robot 150. The one surface 11a faces downward (Z2 side) when the particle absorption tool 10 is held on the hand 151. The probes of the charger 21 faces downward (Z2 side) so as to approach the particle absorption tool from the top side (Z1 side) whereby coming in contact with the interface 15 arranged on the another surface 11b held by the hand 151 in the charger 20.

(Container)

Figure 6:
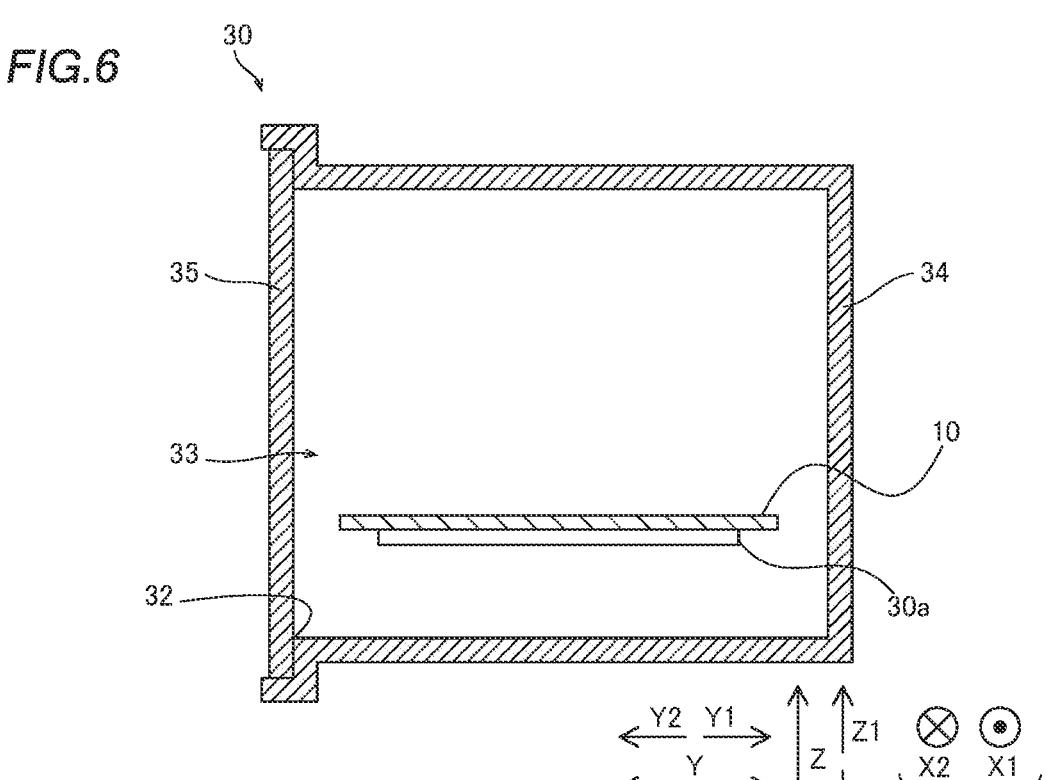
FIG. 6 shows a cross-sectional view showing a container according to the first embodiment as viewed from a side.
Figure 7:
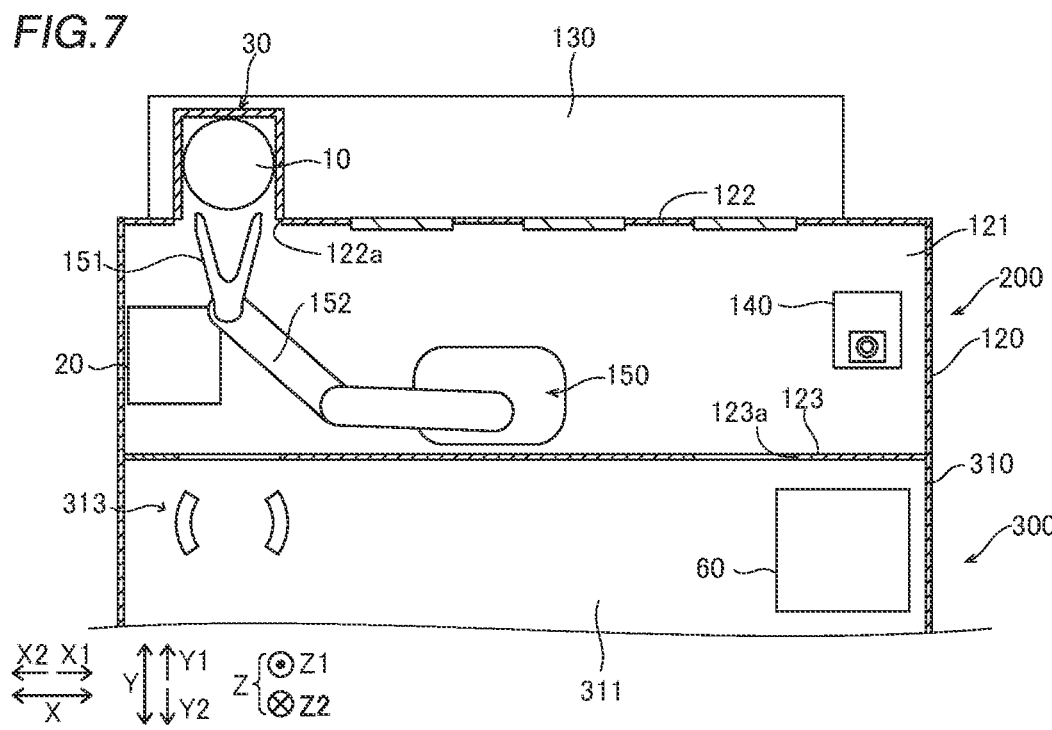
FIG. 7 is a schematic view illustrating an arrangement of the particle absorption tool with respect to the substrate conveyor.

The following description describes the container 30. As shown in FIG. 6, the container 30 previously accommodates the particle absorption tool 10. The container 30 is attached to the substrate conveyor 200, and arranged in a place where the FOUP 110 for accommodating substrates 1 in the substrate conveyor 200 is arranged as shown in FIG. 7. As shown in FIG. 6, the particle absorption tool 10 is placed in the interior space 33 of the container 30. An interior of the container 30 is maintained clean in addition to the FOUP 110 similar to the clean room. The container 30 includes a housing 34 and an opening/closing part 35. The housing 34 has a box shape, and includes the opening 32 opened to the interior of the substrate conveyor 200. The opening/closing part 35 is configured to cover the opening 32 of the housing 34. As shown in FIG. 7, the container 30 is arranged in the FOUP opener 130 where the FOUP 110 is placed in the substrate conveyor 200. The opening/closing part 131 of the FOUP opener 130 and the opening/closing part 35 of the container 30 are opened to connect the interior space 33 of the tool container 30 to the interior space 121 of the housing 120. Accordingly, the particle absorption tool 10 can be moved between the container 30 and the substrate conveyor 200 through the opening 122a of the housing 120. Also, the particle absorption tool 10 can be moved between the substrate conveyor 200 and the substrate processor 300 through the opening 123a of the housing 120.

In the first embodiment, as shown in FIG. 7, an exterior shape of the container 30 is common to an exterior shape of the FOUP 110. Specifically, the housing 34 of the container 30 shown in FIG. 6 and the housing 111 of the FOUP 110 shown in FIG. 1 have the same size. For this reason, the container 30 can be placed in the FOUP opener 130 instead of the FOUP 110. In addition, a diameter of the particle absorption tool 10 is the same as a diameter of the substrate 1. Accordingly, the particle absorption tool 10 can be accommodated in the container 30 similar to a case in which the substrate 1 is accommodated in the FOUP 110. For example, the particle absorption tool 10 is supported by a support 30a of the container 30. An interior of the container 30 is maintained clean with the particle absorption tool 10 being accommodated in the container 30.

(Detector)

In the first embodiment, a detector 50 is provided to detect a degree of particle absorption by the particle absorption tool 10 during a series of operations of the robot arm 152. The series of operations of the robot arm 152 will be is described later. The detector 50 includes a charge-amount detector 51 configured to detect a charge amount of the particle absorption tool 10, and an image capturer 52 configured to capture an image of the particles that are absorbed by the particle absorption tool 10 as shown in FIG. 2. The charge-amount detector 51 is a surface potentiometer, for example. The surface potentiometer can measure an amount of static electric charge by using electrostatic induction phenomenon in which an electric conductor is attracted by a charged object. The surface potentiometer can measure the amount of static electric charge without contact with the particle absorption tool 10.

As shown in FIG. 5, the charge-amount detector 51 and the image capturer 52 of the detector 50 are arranged in the Z2 side part (lower part) of the charger 20. The charge-amount detector 51 is configured to detect a degree of particle absorption by the particle absorption tool 10 being held by the hand 151 in the charger 20. The image capturer 52 is configured to detect the degree of particle absorption by the particle absorption tool 10 by capturing an image of the particle absorption tool 10 being placed in the charger 20. In the first embodiment, the particle absorption tool 10 absorbs particles with a charged surface 11a of the particle absorption tool facing the lower Z2 side, which is a lower side. The image capturer 52 captures an image of the particle absorption tool 10 with the surface 11a facing the Z2 side. In other words, the image capturer 52 is orientated in the Z2 side part (lower part) of the charger 20 to face from the Z2 side to the Z1 side so as to capture the image. For example, the image capturer 52 is a high-resolution camera capable of capturing an image of particles.

In the first embodiment, the cleaner 60 configured to clean the particle absorption tool 10. As shown in FIG. 1, the cleaner 60 is arranged, for example, in the interior space 311 of the substrate processor 300. The substrate processor 300 is a spin dryer, for example. The spin dryer rotates the particle absorption tool 10 to remove particles absorbed onto the particle absorption tool 10 by centrifugal force.
(Method for Controlling Particle Removal System)

The following description describes a method for controlling the particle removal system 100 in operation of removal of particles inside the semiconductor production apparatus 500 executed by the substrate conveyor 200. The operation of the substrate conveyor 200 is controlled by the controller 160. The particle absorption tool 10 is previously manually placed in the container 30. The container 30 is arranged in the substrate conveyor 200 while the interior of the container 30 is maintained clean with the particle absorption tool 10 being accommodated in the container 30. The substrate 1 is not processed by the semiconductor production apparatus 500 during the operation of removal of particles. As shown in FIG. 7, the container 30 is arranged instead of the FOUP 110 in the FOUP opener 130. One container 30 or a plurality of containers 30 can be provided in the FOUP opener 130. The following description describes an exemplary arrangement in which one container 30 is provided in the FOUP opener 130.

Figure 8:
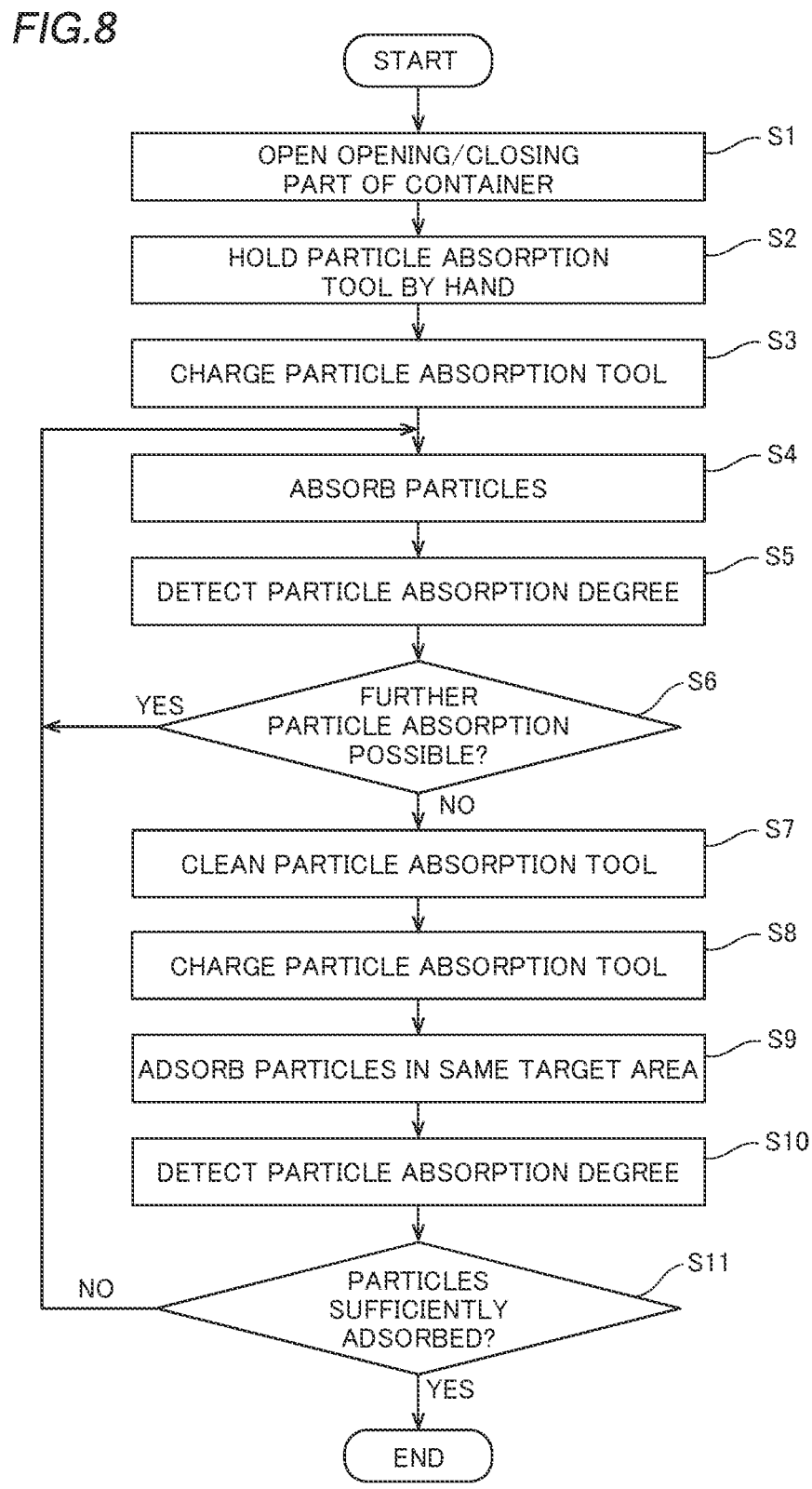
FIG. 8 is a flowchart illustrating a method for controlling the particle removal system according to the first embodiment.

As shown in FIG. 8, in step S1, the opening/closing part 131 of the FOUP opener 130 and the opening/closing part 35 of the container 30 are opened to connect the interior space 33 of the container 30 to the interior space 121 of the housing 120 of the substrate conveyor 200 by the controller 160 by moving the opening mechanism.

Figure 9:
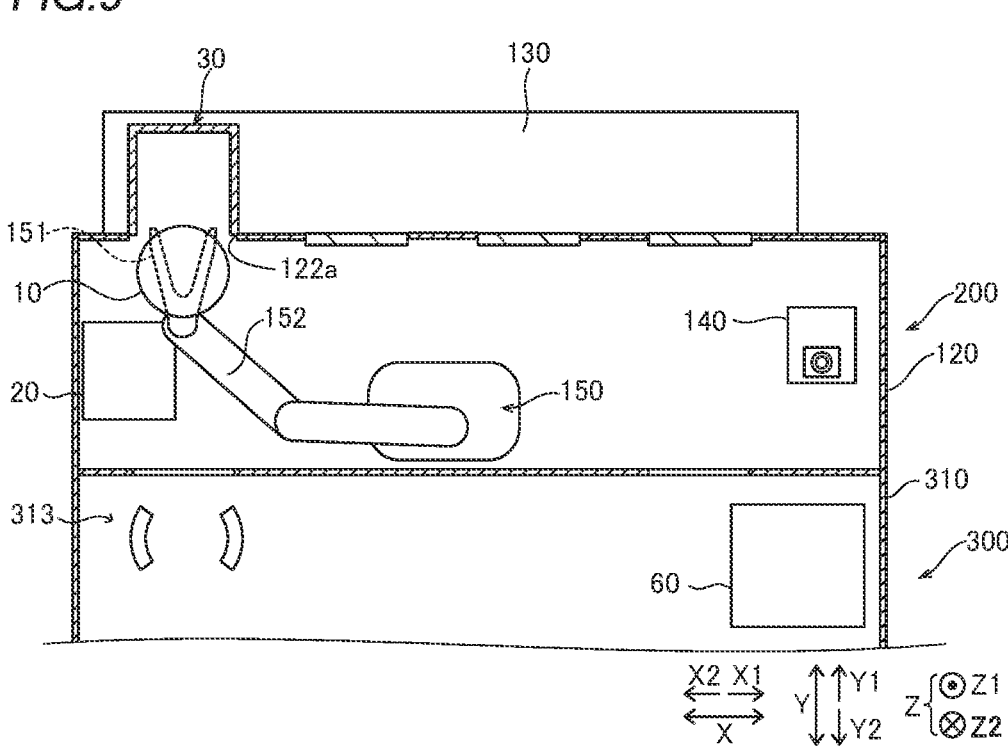
FIG. 9 is a view showing the semiconductor production apparatus with a hand going to hold the particle absorption tool.

In step S2, as shown in FIG. 9, in the first embodiment, the controller 160 directs the hand 151 of the robot arm 152 to hold the particle absorption tool 10 previously accommodated in the container 30. Specifically, the controller 160 moves the hand 151 through the opening 122a of the housing 120 of the substrate conveyor 200 into the interior space 33 of the container 30.

In step S3, as shown in FIG. 5, in the first embodiment, the controller 160 controls operation of the robot 150 to electrostatically charge the particle absorption tool 10 so as to build up the static electric charge by using the charger 20. The robot arm 152 is moved so as to move the particle absorption tool 10 held by the hand 151 to the charger 20 by the controller 160. The robot arm 152 is moved so as to bring the voltage applier 21 into contact with the particle absorption tool 10 held by the hand 151, and to charge the particle absorption tool 10 by the controller 160. Here, application of a voltage by the voltage applier 21 of the charger 20 can be controlled by the controller 160 or by the charger 20.

In step S4, in the first embodiment, after charging the particle absorption tool 10, the controller 160 moves the robot arm 152 and then absorbs particles in at least one of the interior of the substrate conveyor 200 and the interior of the substrate processor 300 by using the particle absorption tool 10 held by the hand 151. Specifically, the particle absorption tool 10 that has been accommodated in the container 30 is moved to the substrate conveyor 200 through the opening 122a of the housing 120 of the substrate conveyor 200, and the substrate processor 300 through the opening 123a. The particle absorption tool 10 can absorb particles cling to a part of the aligner 140, which is arranged in the interior space 121 of the substrate conveyor 200, where the substrate 1 is placed, and the substrate receiving part 313 on which the substrate 1 is placed in the interior space 311 of the substrate processor 300.

The particle removal system 100 according to the first embodiment, the controller 160 controls operation of the robot 150 so as to perform absorption operation that moves the particle absorption tool 10 in the target area for absorption of particles during the absorption of particles. For example, the robot 150 is controlled by the controller 160 to execute conveying operation that holds the particle absorption tool 10 by using the hand 151, and conveys the particle absorption tool 10 held by the hand 151 to the substrate receiving part 313 of the substrate processor 300 as the target area for absorption of particles. Subsequently, the robot 150 places, in the substrate receiving part 313 as the target area, the particle absorption tool 10 on the substrate receiving part 313, and performs the absorption operation by moving the particle absorption tool 10 being placed on a placement position in the target area by using the hand 151 during the absorption of particles after the conveying operation.

Figure 10:
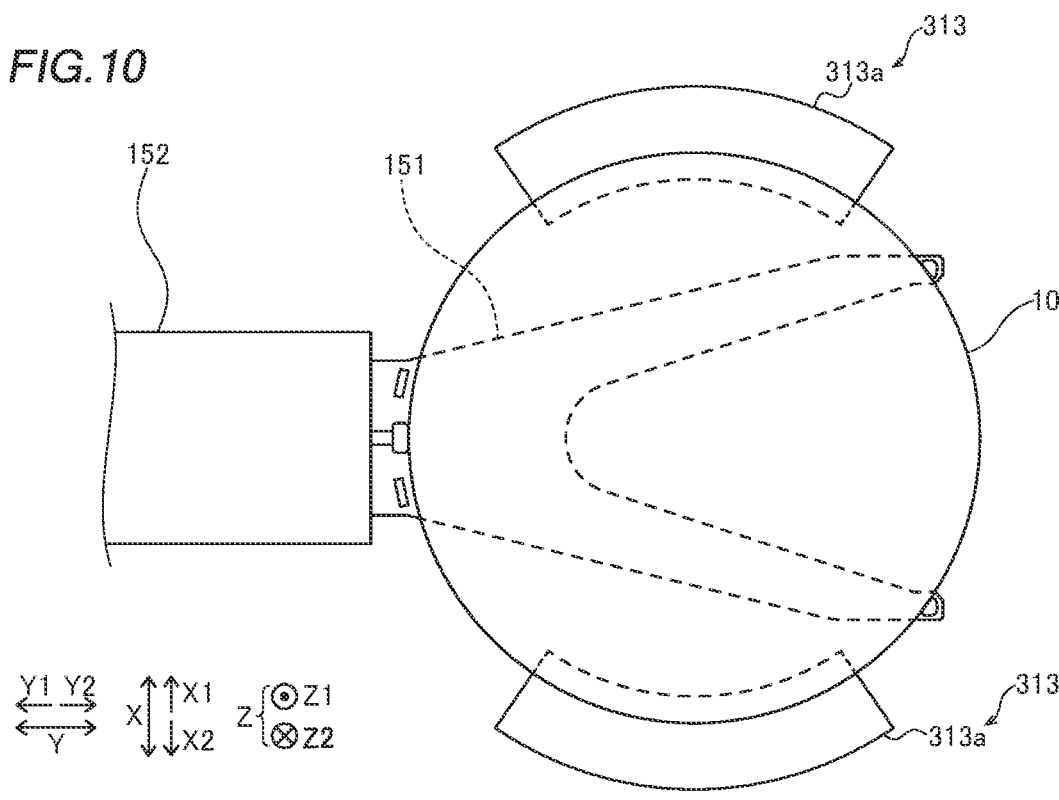
FIG. 10 is a view showing the particle absorption tool placed on a substrate receiving part.

As shown in FIG. 10, the substrate receiving part 313 includes a pair of arc-shaped parts 313a. The arc-shaped parts 313a are a plate-shaped member arranged in an XY plane, which is a horizontal plane. Each of the arc-shaped parts 313a has an arc-shaped rectangular shape curved along the periphery of and substrate 1 and the disk-shaped particle absorption tool 10 similar to the substrate 1.

Figure 11:
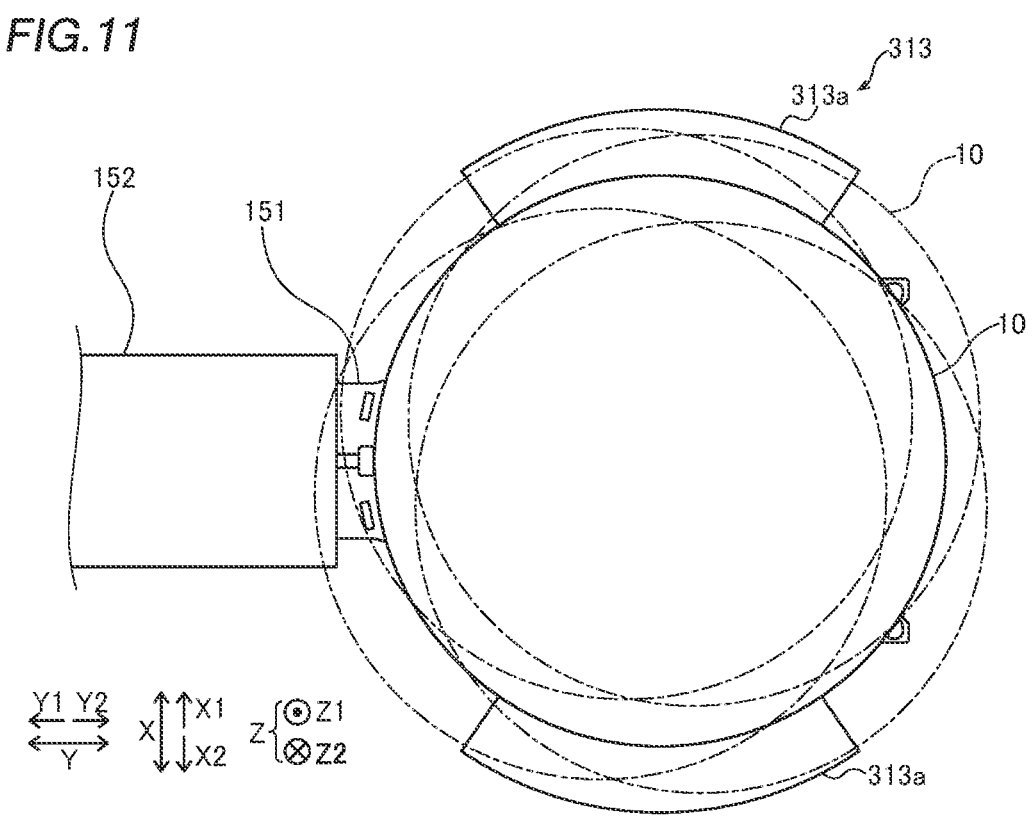
FIG. 11 is a schematic view illustrating operation repositioning the particle absorption tool in absorption operation in the first embodiment.

As shown in FIG. 11, the robot is configured 150 to perform the absorption operation by performing a plurality of operations of repositioning the particle absorption tool 10 being placed on the substrate receiving part 313 while changing the placement position of the particle absorption tool on the substrate receiving part during absorption operation. For example, the robot 150 repositions the particle absorption tool 10 to change a position of the particle absorption tool along the curved shape of the arc-shaped part 313a of the substrate receiving part 313 so as to translate the particle absorption tool along a circle in a horizontal plane. In other words, the robot 150 alternately repeats an operation of holding the particle absorption tool 10, and an operation of changing a position of the hand 151 while holding the particle absorption tool 10. In the first embodiment, the robot 150 changes a position of the particle absorption tool 10 in the XY plane, which is a horizontal plane, while holding and lifting the particle absorption tool 10 from the substrate receiving part 313, and then repositions the particle absorption tool 10 by placing the particle absorption tool 10 onto the substrate receiving part 313 again. Exemplary positions of the particle absorption tool 10 are shown by alternate long and short dash lines when a placement position of the particle absorption tool is changed in FIG. 11. The controller 160 performs the absorption operation in a plurality of target areas including the substrate receiving part 313. In other words, the robot 150 performs conveying operations, which convey the particle absorption tool 10 to the plurality of target areas, and absorption operations, which absorb particles in the plurality of target areas, and absorption operations. After the absorption operations are completed, the procedure goes to step S5.

In step S5, in the first embodiment, the controller 160 detects a degree of particle absorption by the particle absorption tool 10 by using the detector 50. Specifically, the controller 160 moves the particle absorption tool 10 being held by the hand 151 to a position in which the detector 50 is arranged in the charger 20. Subsequently, the controller 160 detects an amount of particles absorbed onto the particle absorption tool 10 by using the charge-amount detector 51 and the image capturer 52 of the detector 50.

Then, in step S6, the controller 160 determines whether the particle absorption tool 10 can further absorb particles. In a case in which the detector 50 is the image capturer 52, the controller 160 detects the amount of absorbed particles based on an image of the particle absorption tool 10 captured by the image capturer 52 by using image processing or some other technique. If the amount of absorbed particles is not greater than a predetermined particle amount threshold, the controller 160 determines that the particle absorption tool 10 can further absorb particles, and the procedure returns to step S4. If the amount of absorbed particles is greater than the predetermined particle amount threshold, the controller 160 determines that the particle absorption tool 10 cannot further absorb particles, and the procedure goes to step S7. In a case in which the detector 50 is the charge-amount detector 51, the charge amount of the particle absorption tool 10 is detected by the charge-amount detector 51. If the charge amount of the particle absorption tool 10 detected by the charge-amount detector 51 is greater than a predetermined charge amount threshold, the controller 160 determines that the particle absorption tool 10 can further absorb particles, and the procedure returns to step S4. If the charge amount of the particle absorption tool 10 detected by the charge-amount detector 51 is not greater than the predetermined charge amount threshold, the controller 160 determines that the particle absorption tool 10 cannot further absorb particles, and the procedure goes to step S7. Accordingly, the degree of particle absorption is detected by the detector 50 during the series of operations in which particles are repeatedly absorbed in step S4.

Figure 12:
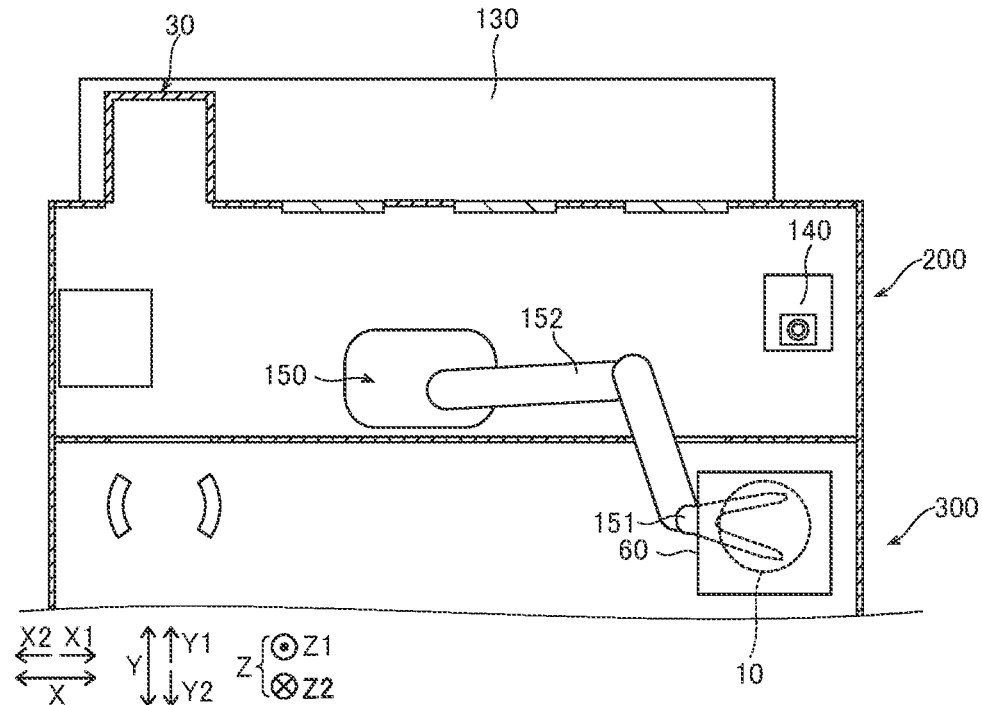
FIG. 12 is a view showing the semiconductor production apparatus in cleaning of the particle absorption tool by using a cleaner.

In step S7, as shown in FIG. 12, in the first embodiment, after absorbing particles by using the particle absorption tool 10, the controller 160 moves the hand 151 by using the robot arm 152 so as to move the particle absorption tool 10 to the cleaner 60. That is, the robot 150 moves the particle absorption tool 10 to the cleaner 60 after absorbing particles in step S4. The cleaner 60 cleans the particle absorption tool 10 moved.

Subsequently, in step S8, the controller 160 electrostatically charges the particle absorption tool 10 so as to build up the static electric charge by using the charger 20 similar to step S3. Subsequently, in step S9, the controller 160 absorbs particles in the same target area as step S4 in order to confirm whether the particles is completely absorbed in the target area for absorption of particles in at least one of the interior of the substrate conveyor 200 and the interior of the substrate processor 300. In step S9, the controller 160 also execute the absorption operation by moving the particle absorption tool 10 in the target area when absorbing particles similar to step S4. For example, the controller 160 executes the absorption operation by conveying the particle absorption tool 10 held by the hand 151 to the substrate receiving part 313 of the substrate processor 300 as the target area for absorption of particles, and by placing the particle absorption tool 10 on the substrate receiving part 313 and by moving the particle absorption tool 10 being placed on the substrate receiving part by using the hand 151 similar to step S4.

Subsequently, in step S10, the controller 160 detects the degree of particle absorption by the particle absorption tool 10 by using the detector 50 similar to step S5. Subsequently, in step S11, it is determined whether particles in the target area are sufficiently absorbed. For example, in a case in which the detector 50 is the image capturer 52, the controller 160 detects the amount of absorbed particles based on an image of the particle absorption tool 10 captured by the image capturer 52 similar to step S6. If the amount of absorbed particles is greater than the predetermined particle amount threshold, the controller 160 determines that the particles are insufficiently absorbed, and the procedure returns to step S4. If the amount of absorbed particles is not greater than the predetermined particle amount threshold, the controller 160 determines that the particles are sufficiently absorbed. If it is determined that the particles are sufficiently absorbed, the operation of removal of particles inside the semiconductor production apparatus 500 executed by the substrate conveyor 200 ends so that processing in the method for controlling the particle removal system 100 ends. The predetermined particle amount threshold in step S11 can be a value different from that in step S6.

Alternatively, in step S11, it can be determined whether particles in the target area are sufficiently absorbed based on a detection result of the charge-amount detector 51. In this case, the charge amount of the particle absorption tool 10 is detected by the charge-amount detector 51. If the charge amount of the particle absorption tool 10 detected by the charge-amount detector 51 is not greater than the predetermined charge amount threshold, the controller 160 determines that the charge amount was decreased by absorbing the particles in the same target area, and determines that the particles are detected. In that case, the particle absorption is not enough and return to step S4. If the charge amount of the particle absorption tool 10 detected by the charge-amount detector 51 is greater than the predetermined charge amount threshold, the controller 160 determines that particles are not additionally absorbed so that the particles are sufficiently absorbed, and the control procedure ends.

In a case in which a plurality of target areas for absorption of particles are specified, processes from step S8 to step S11 can be executed for each of the plurality of target areas to determine whether particles are completely absorbed for each of the plurality of target areas.

Advantages of First Embodiment

The particle removal system 100 includes the robot 150 configured to perform absorption operation that includes at least one of moving the particle absorption tool 10 and pressing the particle absorption tool 10 down in the target area for absorption of particles during the absorption of particles. Accordingly, because absorption operation that includes at least one of moving the particle absorption tool 10 and pressing the particle absorption tool 10 down is performed during the absorption of particles, it possible to more efficiently absorb particles as compared with a case in which the particle absorption tool 10 is merely conveyed to and placed in the target area. Consequently, it is possible to efficiently absorb particles in the target area.

The robot 150 includes the hand 151 configured to hold the particle absorption tool 10. The robot 150 is configured to convey the particle absorption tool 10 to the target area while holding the particle absorption tool 10 by using the hand 151. The robot 150 is configured to perform the absorption operation that includes at least one of moving the particle absorption tool 10 by using the hand 151 and pressing the particle absorption tool 10 down in the target area during the absorption of particles after conveying the particle absorption tool. Accordingly, because the absorption operation is performed by using the particle absorption tool 10 by conveying the particle absorption tool 10 to the target area by the hand 151 of the robot 150, and by holding the particle absorption tool by using the hand 151, it is possible to prevent a configuration of the particle removal system 100 from becoming complicated as compared with a case in which conveying operation that conveys the particle absorption tool to the target area and the absorption operation that absorbs particles in the target area are performed by different configurations. Consequently, it is possible to efficiently absorb particles in the target area while preventing a configuration of the particle removal system 100 from becoming complicated.

The robot 150 is configured to perform the absorption operation by moving the particle absorption tool 10 being placed on a placement position in the target area during the absorption of particles. Accordingly, because the particle absorption tool 10 is moved in the target area, particles can be efficiently absorbed in a wider area of the target area. Also, because particles accumulated in the target area can be risen by moving the particle absorption tool 10, it is possible to efficiently absorb particles.

The robot 150 is configured to perform the absorption operation by repositioning the particle absorption tool 10 being placed on the placement position. Consequently, particles can be more efficiently absorbed by repositioning the particle absorption tool 10 as compared with a case in which only one operation that places the particle absorption tool 10 on the placement position is executed.

The robot 150 is configured to perform the absorption operation by repositioning the particle absorption tool 10 being placed on the target area while changing the placement position of the particle absorption tool in the target area. Consequently, particles can be efficiently absorbed in a wider area of the target area by repositioning the particle absorption tool 10 while changing the placement position of the particle absorption tool.

The robot 150 is configured to perform the absorption operation in the substrate receiving part 313 as the target area on which the substrate 1 is placed. Accordingly, particles can be efficiently absorbed in the substrate receiving part 313 on which the substrate 1 is placed. Because particles can be prevented from clinging to the substrate 1 when the substrate 1 is placed on the substrate receiving part 313, it is possible to effectively prevent occurrence of abnormality caused by particles in processing of the substrate 1.

The robot 150 includes the hand 151 configured to hold the substrate 1 and the particle absorption tool 10, which has a disk shape similar to the substrate 1. The robot 150 is configured to perform the absorption operation by placing the disk-shaped particle absorption tool 10 on the substrate receiving part 313 of the substrate processor 300 as at least one of an interior of the substrate conveyor 200 and an interior of the substrate processor 300 by using the hand 151. Accordingly, because the absorption operation is performed with the disk-shaped particle absorption tool 10, which is similar to the substrate 1, being held by the hand 151 configured to hold the substrate 1, a configuration for absorbing particles can be prevented from becoming complicated as compared with a case in which the absorption operation is performed by a configuration different from the hand 151 configured to hold the substrate 1. Also, because the particle absorption tool 10 has a disk shape similar to the substrate 1, the particle absorption tool 10 can be easily conveyed to and placed on a position where the substrate 1 is placed in at least one of the substrate conveyor 200 and the substrate processor 300. Accordingly, it is possible to easily remove particles in at least one of the substrate conveyor 200 and the substrate processor 300.

The particle removal system 100 includes the controller 160 configured to control operation of the robot 150 so as to cause the robot 150 to perform the absorption operation. Accordingly, the absorption operation can be easily performed by the robot 150 based on the control operation executed by the controller 160.

The particle removal system 100 includes the detector 50 configured to detect a degree of particle absorption by the particle absorption tool 10. Accordingly, it possible to easily determine whether particles are properly absorbed by the absorption operation of the robot 150 based on a detection result obtained by the detector 50. Also, because it is determined whether the particle absorption tool 10 can further absorb particles based on the detection result obtained by the detector 50, it is possible to prevent that ineffective absorption operation, which uses the particle absorption tool 10 that cannot absorb particles, continues.

The particle removal system 100 includes the cleaner 60 configured to clean the particle absorption tool 10. The robot 150 moves the particle absorption tool 10 to the cleaner 60 after performing the absorption movement. Accordingly, because the particle absorption tool 10 onto which particles are adhered can be cleaned, the cleaned particle absorption tool 10 can be used to absorb particles in the next particle absorption operation. Consequently, it is not necessary to prepare a plurality of particle absorption tools 10.

The particle absorption tool 10 is configured to be electrostatically charged so as to build up a static electric charge for absorbing particles. The particle removal system 100 includes the charger 20 configured to electrostatically charge the particle absorption tool 10 so as to build up a static electric charge. The robot 150 is configured to perform the absorption operation by using the particle absorption tool 10 building up the static electric charge by being electrostatically charged by the charger 20. Because the charger 20 is included in the particle removal system 100, the absorption operation can be performed by using the particle absorption tool 10 sufficiently charged by the charger 20. Consequently, the particle absorption tool 10 can sufficiently absorb particles.

Second Embodiment

Figure 13:
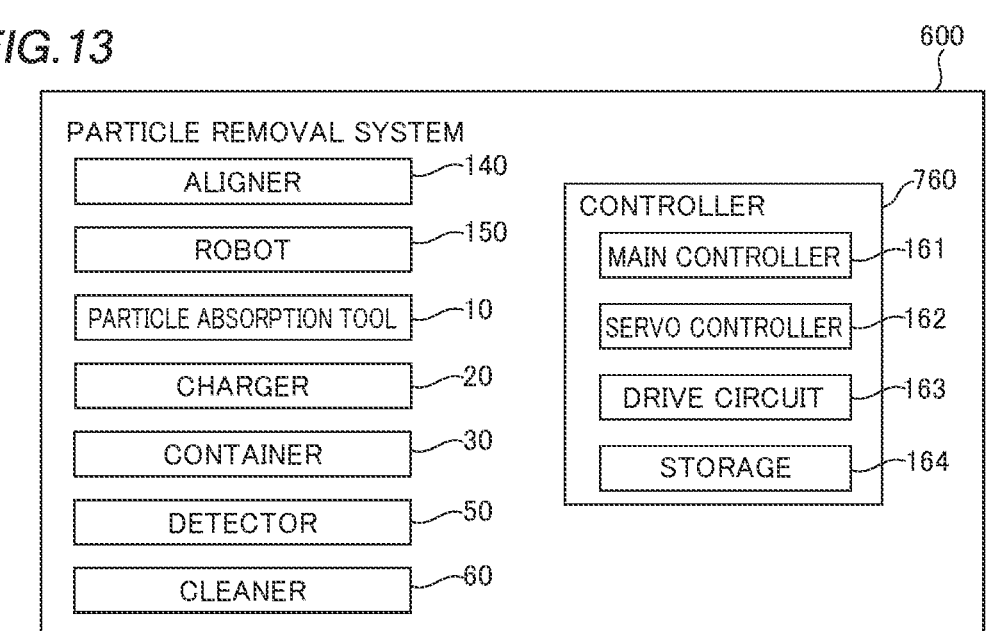
FIG. 13 is a block diagram showing a particle removal system according to a second embodiment.
Figure 14:
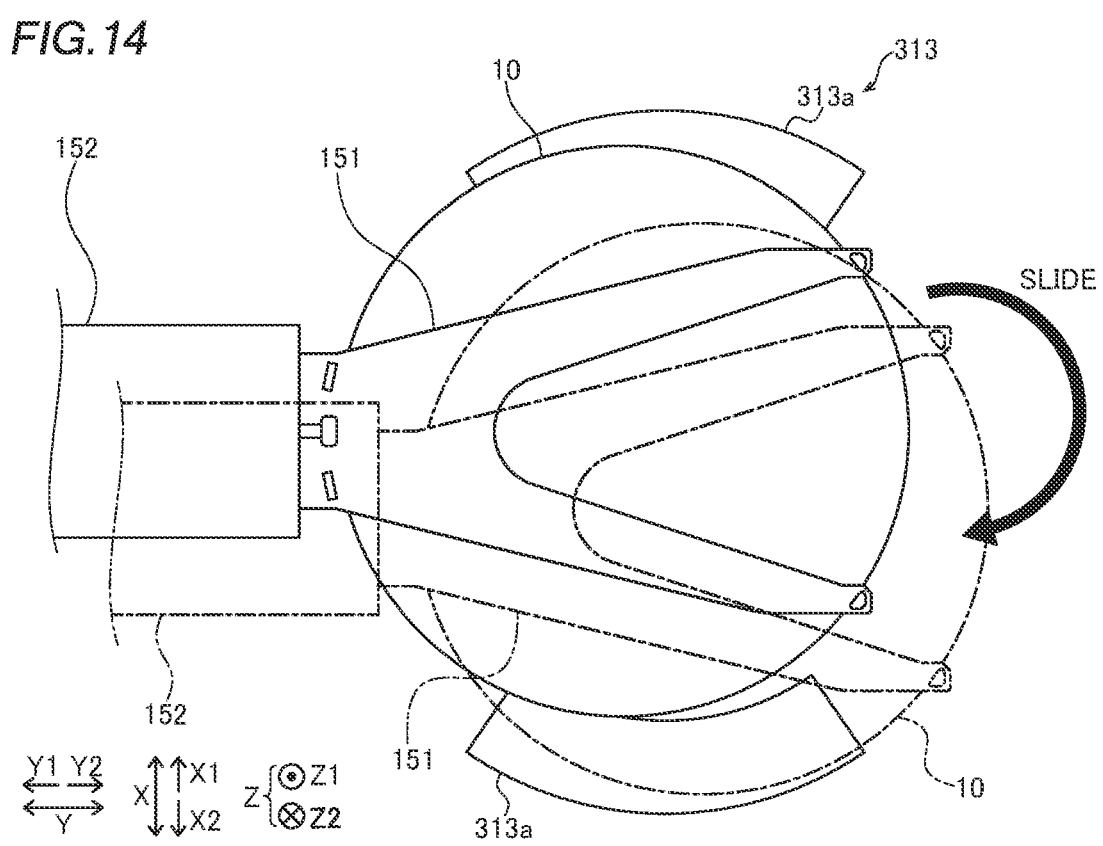
FIG. 14 is a schematic view illustrating operation sliding the particle absorption tool in absorption operation in the second embodiment.

The following description describes a particle removal system 600 according to a second embodiment of the present disclosure with reference to FIGS. 13 and 14. Dissimilar to the first embodiment in which the robot 150 is configured to reposition the particle absorption tool 10 in absorption operation, the robot 150 is configured to slide the particle absorption tool 10 in the second embodiment.

As shown in FIG. 13, the particle removal system 600 according to the second embodiment includes a controller 760. The controller 760 is a robot controller including a main controller 161, a servo controller 162, drive circuits 163, and a storage 164 similar to the controller 160 according to the first embodiment. The controller 760 has a hardware configuration similar to the controller 160 according to the first embodiment. The controller 760 controls operations of parts of the particle removal system 600 including the robot 150 similar to the controller 160 according to the first embodiment, and executes control processes from step S1 to step S11 similar to the method for controlling the particle removal system 100 in the particle removal operation shown in FIG. 8.

In the second embodiment, in the process of controlling particle absorption in step S4, the controller 760 performs absorption operation by controlling operation of the robot 150 similar to the first embodiment. In the second embodiment, as shown in FIG. 14, the robot 150 is configured to perform the absorption operation by sliding the particle absorption tool 10 being placed on the substrate receiving part 313, which is a target area for absorption of particles. Specifically, after placing the particle absorption tool 10 on the substrate receiving part 313, the robot 150 moves the hand 151 so as to bring the hand into contact with the surface 11*b* on the Z1 side (upper side) of the particle absorption tool 10. Subsequently, the robot 150 moves the hand 151 in a circular shape on a XY plane, which is a horizontal plane, extending along the curved shape of the arc-shaped part 313*a* of the substrate receiving part 313 while keeping the hand 151 in contact with the particle absorption tool 10 so as to slide the particle absorption tool 10 on the substrate receiving part 313. That is, in the second embodiment, in the absorption operation, the robot 150 slides the particle absorption tool 10 without lifting the particle absorption tool from the substrate receiving part 313 with the particle absorption tool being kept in contact with the substrate receiving part 313. Alternatively, the particle absorption tool 10 can be slid with a surface on the Z2 side (lower side) of the particle absorption tool being kept by the hand 151. The other configuration of the second embodiment is similar to the first embodiment.

Advantages of Second Embodiment

The robot 150 is configured to perform the absorption operation by sliding the particle absorption tool 10 being placed on the substrate receiving part. Consequently, particles can be efficiently absorbed in a wider area of the target area by a relatively simple operation that slides the particle absorption tool 10 as compared with a operation that execute a plurality of motions of lifting the particle absorption tool 10 while changing a position of the particle absorption tool.

Third Embodiment

Figure 15:
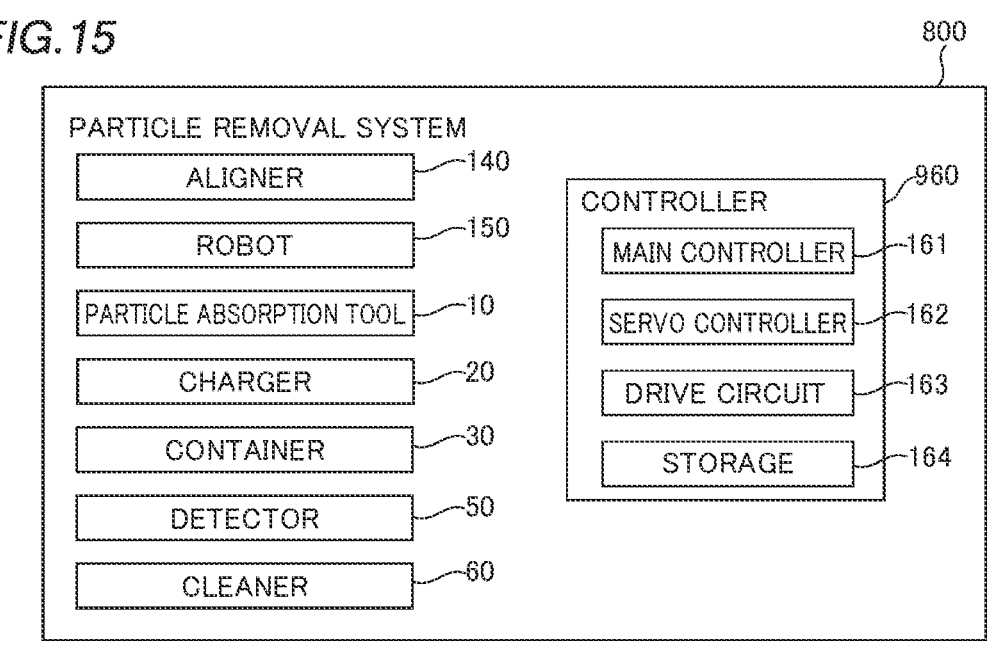
FIG. 15 is a block diagram showing a particle removal system according to a third embodiment.
Figure 16:
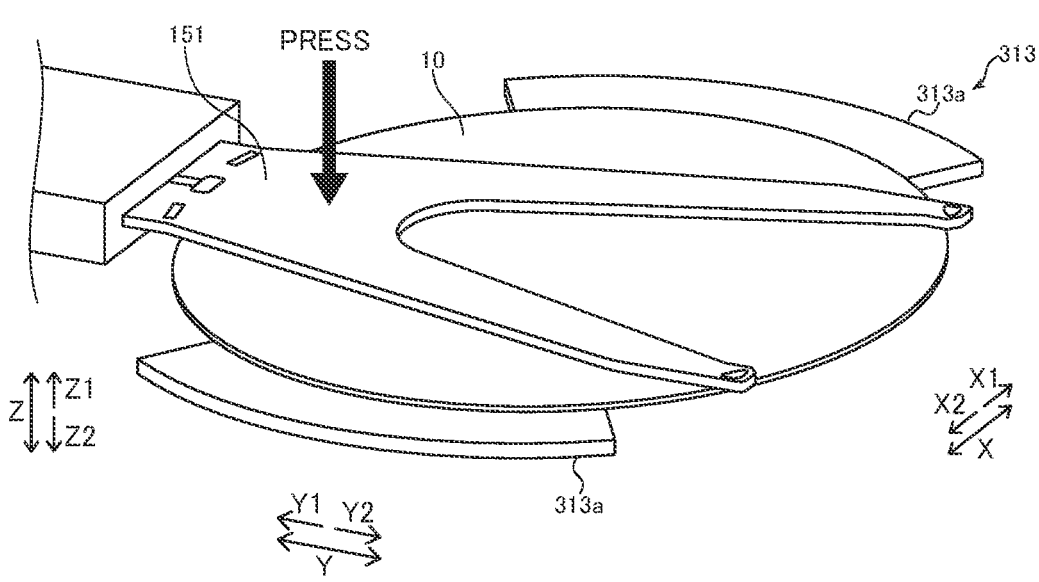
FIG. 16 is a schematic view illustrating operation pressing the particle absorption tool in absorption operation in the third embodiment.

The following description describes a particle removal system 800 according to a third embodiment of the present disclosure with reference to FIGS. 15 and 16. Dissimilar to the first embodiment in which the robot 150 is configured to reposition the particle absorption tool 10 in absorption operation, the robot 150 is configured to press the particle absorption tool 10 in the third embodiment.

As shown in FIG. 15, the particle removal system 800 according to the third embodiment includes a controller 960. The controller 960 is a robot controller including a main controller 161, a servo controller 162, drive circuits 163, and a storage 164 similar to the controller 160 according to the first embodiment and the controller 760 according to the second embodiment. The controller 960 has a hardware configuration similar to the controller 160 according to the first embodiment and the controller 760 according to the second embodiment. The controller 960 controls operations of parts of the particle removal system 800 including the robot 150 similar to the controller 160 according to the first embodiment and the controller 760 according to the second embodiment, and executes control processes from step S1 to step S11 similar to the method for controlling the particle removal system 100 in the particle removal operation shown in FIG. 8.

In the third embodiment, in the process of controlling particle absorption in step S4, the controller 960 performs absorption operation by controlling operation of the robot 150 similar to the first and second embodiments. In the third embodiment, as shown in FIG. 16, the robot 150 is configured to perform the absorption operation by pressing the particle absorption tool 10 being placed on the substrate receiving part 313, which is a target area for absorption of particles. Specifically, after placing the particle absorption tool 10 on the substrate receiving part 313, the robot 150 moves the hand 151 so as to bring the hand into contact with the surface 11*b* on the Z1 side (upper side) of the particle absorption tool 10. Subsequently, the robot 150 moves the hand 151 toward the Z2 side (downward) while keeping the hand 151 in contact with the particle absorption tool 10 so as to press the particle absorption tool 10 against the substrate receiving part 313. That is, in the third embodiment, in the absorption operation, the robot 150 applies a force to the particle absorption tool 10 so as to press the particle absorption tool against the substrate receiving part 313 without moving the particle absorption tool relative to the substrate receiving part 313. The other configuration of the third embodiment is similar to the first and second embodiments.

Advantages of Third Embodiment

The robot 150 is configured to perform the absorption operation by pressing the particle absorption tool 10 being placed on the substrate receiving part 313. Accordingly, because a larger amount of particles can be absorbed onto the particle absorption tool 10 by pressing the particle absorption tool 10, it is possible to more efficiently absorb particles.

Modified Embodiments

Note that the embodiment disclosed this time must be considered as illustrative in all points and not restrictive. The scope of the present disclosure is not shown by the above description of the embodiments but by the scope of claims for patent, and all modifications or modified examples within the meaning and scope equivalent to the scope of claims for patent are further included.

While the example in which an exterior shape of the container 30 is common to an exterior shape of the FOUP 110 has been shown in the aforementioned first, second and third embodiments, the present disclosure is not limited to this. For example, alternatively, the container can have an exterior shape different from an exterior shape of the FOUP as long as the container can be placed in the substrate conveyor.

While the example in which absorption operation is performed by using the particle absorption tool 10 by conveying the particle absorption tool 10 by the hand 151, and by pressing the particle absorption tool by using the hand 151 has been shown in the aforementioned first, second, and third embodiments, the present disclosure is not limited to this. In this disclosure, the conveying operation that conveys the particle absorption tools to the target area for particle absorption, and the absorption operation that absorbs particles onto the particle absorption tools can be performed by configurations different from each other.

Although it has been illustratively described that the robot 150 performs repositioning operation that repositions the particle absorption tool 10 as the absorption operation in the aforementioned first embodiment, that the robot 150 performs sliding operation that slides the particle absorption tool 10 as the absorption operation in the aforementioned second embodiment, and that the robot 150 performs pressing operation that presses the particle absorption tool 10 as the absorption operation in the aforementioned third embodiment, the present disclosure is not limited to this. In the present disclosure, alternatively, some of the repositioning operation, sliding operation, and pressing operation can be combined in the absorption operation. For example, the particle absorption tool can be pressed every when repositioned, or the repositioning operation and the sliding operation can be alternately repeated. Alternatively, the particle absorption tool can be moved in a manner different from the aforementioned embodiment in absorption operation. For example, the particle absorption tool can be rapidly moved to a placement position so as to rise particles accumulated. In this case, a moving speed of the robot can be relatively high so that the particle absorption tool moves at a relatively high speed, or the hand configured to hold the particle absorption tool can release the particle absorption tool that is held by the hand at a position spaced away from the placement position to accelerate the particle absorption tool by gravity to move the particle absorption tool moves at a relatively high speed to the placement position in the target area. For example, the hand can disengage the particle absorption tool at an angle inclined with respect to a horizontal plane from the holding state so that the particle absorption tool is moved by gravity so that the particle absorption tool falls onto the placement position whereby placing the placement position at the placement position.

While the example in which the particle absorption tool 10 is repositioned by the robot 150 while changing a placement position of the particle absorption tool in the absorption operation has been shown in the aforementioned first embodiment, the present disclosure is not limited to this. In the present disclosure, alternatively, the particle absorption tool can be repositioned without changing the position in the absorption operation.

While the example in which the target area for particle absorption is the substrate receiving part 313 in the substrate processor 300 has been shown in the aforementioned first, second, and third embodiments, the present disclosure is not limited to this. In the present disclosure, alternatively, the target area for particle absorption can be a substrate receiving part in the substrate conveyor. Alternatively, the target area can be a part other than the part on which the substrate is placed. Alternatively, the absorption operation can be performed without the particle absorption tool being placed on the placement position. For example, the particle absorption tool can be conveyed to the target area while being held by the hand, and then can be moved while being held by the hand in the absorption operation. In this case, the particle absorption tool can be moved without being in contact with the target area such as the substrate receiving part during the absorption operation. For example, the absorption operation can be performed by shaking the particle absorption tool rightward and leftward in the target area with the particle absorption tool being held by the hand of the robot.

While the example in which the target area for particle absorption is the substrate receiving part 313 including a pair of arc-shaped parts 313a has been shown in the aforementioned first, second, and third embodiments, the present disclosure is not limited to this. In the present disclosure, alternatively, the target area can be a substrate receiving part that has a shape other than a sector shape. For example, the target area for particle absorption can be a substrate receiving part having a rectangular shape, a circular shape, etc. Also, the target area for particle absorption can be a substrate receiving part including a rod-shaped support such as a pin. In a case in which particles are absorbed in a plurality of target areas, structures such as substrate receiving parts in the plurality of target areas can have different shapes. Also, different types of operations can be performed as the absorption operation in the plurality of target areas.

While the example in which the particle absorption tool 10 has a disk shape similar to the substrate 1 has been shown in the aforementioned first, second, and third embodiments, the present disclosure is not limited to this. In the present disclosure, the particle absorption tool does necessarily have a shape similar to the substrate. For example, the particle absorption tool can have a polygonal plate such as a rectangular plate, or does necessarily have a plate shape.

While the example in which the particle absorption tool 10 is accommodated in the tool container 30 has been shown in the aforementioned first, second, and third embodiments, the present disclosure is not limited to this. In the present disclosure, alternatively, the particle absorption tool can be accommodated not in the tool container but in the substrate conveyor or the substrate processor.

While the example in which the charger 20 is placed in the interior space 121 of the housing 120 of the substrate conveyor 200 has been shown in the aforementioned first, second, and third embodiments, the present disclosure is not limited to this. In the present disclosure, alternatively, the charger can be arranged in the interior of the substrate processor. The charger can be arranged in the container. Alternatively, the charger can be arranged in a container different from the container that is configured to accommodate the particle absorption tool. Alternatively, the charger can be provided to the robot or the aligner in the substrate conveyor. Alternatively, the charger can be arranged outside of the substrate conveyor. That is, the charger can be arranged outside of the semiconductor production apparatus, and the particle absorption tool that is previously electrostatically charged so as to build up a static electric charge can be conveyed into into the semiconductor production apparatus.

While the example in which the voltage applier 21 is configured to contact the interfaces 15 arranged on the surface 11b in the main surface of the disk-shaped particle absorption tool 10 so as to apply a voltage to the particle absorption tool 10 has been shown in the aforementioned first, second, and third embodiments, the present disclosure is not limited to this. In the present disclosure, alternatively, the voltage applier can be brought into contact with a peripheral part of the particle absorption tool.

While the example in which the particle removal system 100 includes the detector 50 including the charge-amount detector 51 and the image capturer 52 provided to the charger 20 has been shown in the aforementioned first and second embodiments, the present disclosure is not limited to this. In the present disclosure, alternatively, no detector can be included in the particle removal system. In this case, for example, if one cycle of particle absorption operations of the particle absorption tool ends, the cycle of particle absorption operations is completed. Alternatively, the detector can include one of the charge-amount detector and the image capturer. Alternatively, the charge-amount detector or the image capturer can be arranged any of the robot, the substrate conveyor, the substrate processor, and the FOUP. Alternatively, the detector can be arranged outside of the substrate conveyor, the substrate processor, or the FOUP.

While the example in which the hand 151 is an active type hand using an edge grip configured to catch the substrate 1 or the particle absorption tool 10 has been shown in the aforementioned first, second, and third embodiments, the present disclosure is not limited to this. In the present disclosure, alternatively, the hand can be be an active vacuum type hand. Alternatively, the hand can be a passive type hand configured to non-securely hold the substrate or the particle absorption tool.

While the example in which the particle absorption tool 10 is conveyed to the cleaner 60 arranged in the substrate processor 300 by the robot 150 has been shown in the aforementioned first, second, and third embodiments, the present disclosure is not limited to this. In the present disclosure, alternatively, the cleaner can be arranged in the substrate conveyor. Alternatively, the cleaner can be arranged outside of the substrate processor and the substrate conveyor. Alternatively, the particle absorption tool can be conveyed to the cleaner by a conveying device different from the robot.

While the example in which the particle absorption tool 10 is configured to be electrostatically charged so as to build up a static electric charge for absorbing particles has been shown in the aforementioned first, second, and third embodiments, the present disclosure is not limited to this. In the present disclosure, alternatively, particles can be absorbed by a means other than static electric charge. For example, an adhesive material can be applied onto a surface of the particle absorption tool to absorb particles, or the particle absorption tool can have a suction hole for sucking air to absorb particles by sucking air through the suction hole.

While the example in which the particle removal operation ends after the particle absorption tool 10 is cleaned by the cleaner 60 has been shown in the aforementioned first, second, and third embodiments, the present disclosure is not limited to this. In the present disclosure, alternatively, after the particle absorption tool is cleaned by the cleaner, operation of the robot can cause the charger to recharge the particle absorption tool and restart the particle removal operation.

While the example in which the controller 160, which is a robot controller, controls operation of the robot 150, operation of the aligner 140, operation of the charger 20, operation of the cleaner 60, and detection of a degree of particle absorption by the detector 50 has been shown in the aforementioned first, second, and third embodiments, the present disclosure is not limited to this. In the present disclosure, alternatively, some of controls operation of the robot, operation of the aligner, operation of the charger device operation of the cleaner, and detection of a degree of particle absorption by the detector can be executed by different hardware components. For example, a controller that is provided separately from the robot controller for controlling operation of the robot can be configured to control operation of the aligner and operation of the cleaner.

Functions of elements disclosed in this specification can be realized by a circuit or processing circuit including a general purpose processor, a dedicated processor, an Integrated circuit, ASIC (Application Specific Integrated Circuits), a conventional circuit and/or combination of them configured or programmed to realize the functions disclosed. Because processors include transistors and other circuits, they are considered as a processing circuit or a circuit. In the present disclosure, circuits, units or means are hardware for realizing the functions stated above, or hardware programmed to realize the functions stated above. The hardware can be hardware disclosed in this specification, or can be other known hardware programed or configured to realize the functions stated above. In the case in which the hardware is a processor that can be considered as one type of circuits, the circuit, means or unit is a combination of hardware and software, and the software is used for configuration of the hardware and/or the processor.

Modes

The aforementioned exemplary embodiment will be understood as concrete examples of the following modes by those skilled in the art.

(Mode 1)

A particle removal system includes a particle absorption tool configured to absorb particles; a robot configured to perform absorption operation that includes at least one of moving the particle absorption tool and pressing the particle absorption tool down in the target area in a target area for absorption of particles during the absorption of particles.

(Mode 2)

In the particle removal system according to mode 1, the robot includes a hand configured to hold the particle absorption tool, and is configured to convey the particle absorption tool to the target area while holding the particle absorption tool by using the hand, and to perform the absorption operation that includes at least one of moving the particle absorption tool by using the hand and pressing the particle absorption tool down in the target area in a target area for absorption of particles during the absorption of particles after conveying the particle absorption tool.

(Mode 3)

In the particle removal system according to mode 1 or 2, the robot is configured to perform the absorption operation by moving the particle absorption tool being placed on a placement position in the target area during the absorption of particles.

(Mode 4)

In the particle removal system according to mode 3, the robot is configured to perform the absorption operation by repositioning the particle absorption tool being placed on the placement position.

(Mode 5)

In the particle removal system according to mode 4, the robot is configured to perform the absorption operation by repositioning the particle absorption tool being placed on the target area while changing the placement position of the particle absorption tool in the target area.

(Mode 6)

In the particle removal system according to any of modes 3 to 5, the robot is configured to perform the absorption operation by sliding the particle absorption tool being placed on the placement position.

(Mode 7)

In the particle removal system according to any of modes 1 to 6, the robot is configured to perform the absorption operation in a substrate receiving part as the target area on which a substrate is placed.

(Mode 8)

In the particle removal system according to mode 7, the robot includes a hand configured to hold the substrate and the particle absorption tool, which has a disk shape similar to the substrate, and is configured to perform the absorption operation by placing the disk-shaped particle absorption tool on the substrate receiving part of at least one of an interior of a substrate conveyor and an interior of a substrate processor by using the hand.

(Mode 9)

In the particle removal system according to mode 7 or 8, the robot is configured to perform the absorption operation by pressing the particle absorption tool being placed on the substrate receiving part.

(Mode 10)

In the particle removal system according to any of modes 1 to 9, a controller configured to control operation of the robot so as to cause the robot to perform the absorption operation is further provided.

(Mode 11)

In the particle removal system according to any of modes 1 to 10, a detector configured to detect a degree of particle absorption by the particle absorption tool is further provided.

(Mode 12)

In the particle removal system according to any of modes 1 to 11, a cleaner configured to clean the particle absorption tool is further provided; and the robot is configured to, after perform the absorption operation, to move the particle absorption tool to the cleaner.

(Mode 13)

In the particle removal system according to any of modes 1 to 12, the particle absorption tool is configured to be electrostatically charged so as to build up a static electric charge for absorbing particles; a charger configured to electrostatically charge the particle absorption tool so as to build up the static electric charge is further provided; and the robot is configured to perform the absorption operation by using the particle absorption tool building up the static electric charge by being electrostatically charged by the charger.

(Mode 14)

A method for controlling a particle removal system includes holding a particle absorption tool configured to absorb particles by using a robot; and performing absorption operation that includes at least one of moving the particle absorption tool and pressing the particle absorption tool down in the target area in a target area for absorption of particles during the absorption of particles by using the robot.

What is claimed is:

1. A particle removal system comprising:

an electrostatic particle absorption tool configured to be electrostatically charged in order to absorb particles;

a receiving part to receive a substrate; and a robot configured to perform absorption operation that includes at least one of moving the particle absorption tool and pressing the particle absorption tool in a target area for absorption of particles during the absorption of particles, wherein the robot includes a hand configured to hold the substrate and the particle absorption tool and place the substrate in the receiving part, and the hand is configured to repeatedly reposition the particle absorption tool to change a position of the particle absorption tool by repeatedly moving the particle absorption tool in a horizontal plane of the receiving part.

2. The particle removal system according to claim 1, wherein the robot is configured to convey the particle absorption tool to the target area while holding the particle absorption tool by using the hand, and to perform the absorption operation that includes at least one of moving the particle absorption tool by using the hand and pressing the particle absorption tool in the target area during the absorption of particles after conveying the particle absorption tool.

3. The particle removal system according to claim 1, wherein the robot is configured to perform the absorption operation by moving the particle absorption tool being placed on a placement position in the target area during the absorption of particles.

4. The particle removal system according to claim 3, wherein the robot is configured to perform the absorption operation by sliding the particle absorption tool being placed on the placement position.

5. The particle removal system according to claim 1, wherein the robot is configured to perform the absorption operation by repositioning the particle absorption tool being placed on the target area while changing the placement position of the particle absorption tool in the target area.

6. The particle removal system according to claim 1, wherein the robot is configured to perform the absorption operation in a substrate receiving part as the target area on which a substrate is placed.

7. The particle removal system according to claim 6, wherein the particle absorption tool has a disk shape similar to the substrate, and the robot is configured to perform the absorption operation by placing the disk-shaped particle absorption tool on the substrate receiving part of at least one of an interior of a substrate conveyor and an interior of a substrate processor by using the hand.

8. The particle removal system according to claim 6, wherein the robot is configured to perform the absorption operation by pressing the particle absorption tool being placed on the substrate receiving part.

9. The particle removal system according to claim 1 further comprising a controller comprising a processor configured to perform operations comprising operations to control operation of the robot so as to cause the robot to perform the absorption operation.

10. The particle removal system according to claim 1 further comprising a detector comprising a camera and a charge meter configured to detect a degree of particle absorption by the particle absorption tool.

11. The particle removal system according to claim 1 further comprising a cleaner configured to clean the particle absorption tool, wherein the robot is configured to, after perform the absorption operation, to move the particle absorption tool to the cleaner.

12. The particle removal system according to claim 1, wherein the particle absorption tool is configured to be electrostatically charged so as to build up a static electric charge for absorbing particles;

the particle removal system further comprises a charger configured to electrostatically charge the particle absorption tool so as to build up the static electric charge; and the robot is configured to perform the absorption operation by using the particle absorption tool building up the static electric charge by being electrostatically charged by the charger.

* * * * *